(12) United States Patent  (10) Patent No.:  US 10,592,382 B2
Kuster  (45) Date of Patent:  Mar. 17, 2020

(54) ADVANCED COMMUNICATION COMPUTER WITH DEDICATED NETWORK ADAPTOR PROCESSOR FOR SENDING SECURE COMMUNICATIONS ACROSS NETWORKS

(71) Applicant: Martin Kuster, Walchwil (CH)

(72) Inventor: Martin Kuster, Walchwil (CH)

( * ) Notice: Subject to any disclaimer, the term of this patent is extended or adjusted under 35 U.S.C. 154(b) by 107 days.

(21) Appl. No.: 15/629,437

(22) Filed: Jun. 21, 2017

(65) Prior Publication Data

US 2017/0371760 A1  Dec. 28, 2017

Related U.S. Application Data

(60) Provisional application No. 62/353,443, filed on Jun. 22, 2016.

(51) Int. Cl.
| | | |
|---|---|---|
| *G06F 11/00* | (2006.01) | |
| *G06F 11/34* | (2006.01) | |
| *H04L 12/70* | (2013.01) | |
| *H04L 29/08* | (2006.01) | |

(Continued)

(52) U.S. Cl.
CPC ........ *G06F 11/349* (2013.01); *G06F 11/1417* (2013.01); *G06F 11/3006* (2013.01); *H04L 47/00* (2013.01); *H04L 67/12* (2013.01); *G06F 2201/805* (2013.01)

(58) Field of Classification Search
CPC .............. G06F 11/0751; G06F 11/076; G06F 11/1417; G06F 11/1438; G06F 11/1441; G06F 11/3006; G06F 11/349; H04L 9/00
See application file for complete search history.

(56) References Cited

U.S. PATENT DOCUMENTS

| | | | | |
|---|---|---|---|---|
| 8,523,610 B2* | 9/2013 | Kuster | ................... | H01R 27/00 439/607.01 |
| 9,015,499 B2* | 4/2015 | Grube | ............... | G06F 17/30371 711/114 |

(Continued)

FOREIGN PATENT DOCUMENTS

| | | |
|---|---|---|
| EP | 2608450 A1 | 6/2013 |
| WO | 2017221182 A1 | 12/2017 |

OTHER PUBLICATIONS

International Search Report and Written Opinion in Related PCT Application No. PCT/IB2017/053715 dated Sep. 4, 2017, 12 pages.

(Continued)

*Primary Examiner* — Elmira Mehrmanesh

(74) *Attorney, Agent, or Firm* — Kilpatrick Townsend & Stockton LLP

(57) ABSTRACT

Described are advanced communication computers that include a processor, at least one network adaptor connected to the processor, wherein the at least one network adaptor comprises a separate processor, at least one remote network connected to the at least one network adaptor, and at least one remote server connected to the at least one remote network. The processor is configured to identify an expected performance level of the at least one network adaptor, collect actual performance data from the at least one processor, and compare the actual performance data to the expected performance level to identify issues with signal condition, network traffic, interference, and other similar metrics.

14 Claims, 11 Drawing Sheets

(51) Int. Cl.
*G06F 11/14* (2006.01)
*G06F 11/30* (2006.01)

(56) References Cited

U.S. PATENT DOCUMENTS

| | | | | |
|---|---|---|---|---|
| 9,021,314 B1* | 4/2015 | Sorenson, III | .......... | H04L 63/08 |
| | | | | 714/47.1 |
| 9,813,320 B2* | 11/2017 | Edwards | ................ | H04L 12/66 |
| 10,326,798 B2* | 6/2019 | Lambert | ................ | H04L 63/18 |
| 2005/0043933 A1* | 2/2005 | Rappaport | ............. | H04L 41/22 |
| | | | | 703/1 |
| 2012/0084838 A1* | 4/2012 | Inforzato | .............. | G06F 21/575 |
| | | | | 726/4 |
| 2012/0166623 A1* | 6/2012 | Suit | .................... | G06F 11/3006 |
| | | | | 709/224 |
| 2013/0061167 A1* | 3/2013 | Rhodes | ................ | G06F 11/349 |
| | | | | 715/781 |
| 2013/0132854 A1* | 5/2013 | Raleigh | ................ | G06F 3/0482 |
| | | | | 715/738 |
| 2013/0173904 A1* | 7/2013 | Obligacion | ............. | H04L 67/06 |
| | | | | 713/150 |
| 2013/0238791 A1* | 9/2013 | Anderson | ........... | G06F 11/3006 |
| | | | | 709/224 |
| 2014/0304403 A1* | 10/2014 | Hadeli | ................. | H04L 41/145 |
| | | | | 709/224 |
| 2014/0379857 A1* | 12/2014 | Kim | ........................ | H04L 67/32 |
| | | | | 709/217 |
| 2015/0254088 A1* | 9/2015 | Chou | ................. | G06F 9/45541 |
| | | | | 709/212 |
| 2016/0028696 A1* | 1/2016 | Howe | ................ | H04L 63/0428 |
| | | | | 713/162 |
| 2016/0036861 A1* | 2/2016 | Mattes | ............... | H04L 63/0272 |
| | | | | 726/1 |
| 2017/0085413 A1* | 3/2017 | Cencini | ............... | H05K 7/1497 |
| 2017/0195231 A1* | 7/2017 | Lopez Serrano | ....... | H04L 47/11 |

OTHER PUBLICATIONS

International Preliminary Report on Patentability in Related PCT Application PCT/IB2017/053715, dated Dec. 25, 2018, 7 pages.

* cited by examiner

ADVANCED COMMUNICATION COMPUTER WITH DEDICATED NETWORK ADAPTOR PROCESSOR FOR SENDING SECURE COMMUNICATIONS ACROSS NETWORKS

REFERENCE TO RELATED APPLICATIONS

This application claims the benefit of U.S. Provisional Application No. 62/353,443, filed Jun. 22, 2016 and entitled ADVANCED COMMUNICATION COMPUTER, which is incorporated in its entirety by this reference.

FIELD OF THE INVENTION

The invention relates to computer networks and routers for managing connections to remote servers via multiple network adaptors, each connected to a separate remote network or several connected to the same network, for extending one or more of bandwidth and reliability.

BACKGROUND

Computers are able to communicate with other computers and systems when such devices are connected together as part of a communications network, such as the Internet, local area networks ("LAN"), and wide area networks ("WAN"). Routers manage network connections between multiple devices on a LAN and an upstream connection to another network that typically leads to the Internet.

Originally, most Internet access was from local area networks or dial-up connections using modems and telephone lines, which use a modem and a phone call placed over the public switched telephone network ("PSTN") to connect to a pool of modems operated by an Internet service provider ("ISP"). Dial-up is one of the slowest methods of accessing the Internet, typically not exceeding 56 kbit/s.

Broadband includes a broad range of technologies, all of which provide higher data rate access to the Internet than dial-up. Cable Internet access or cable modem access provides Internet access via hybrid fiber coaxial wiring originally developed to carry television signals. Cable networks regularly provide encryption schemes for data traveling to and from customers, but these schemes may be thwarted, and are particularly susceptible to intercepted by neighboring subscribers because broadband cable subscribers share the same local line.

Digital Subscriber Line ("DSL") service provides a connection to the Internet through the telephone network. Unlike dial-up, DSL can operate using a single phone line without preventing normal use of the telephone line for voice phone calls. DSL uses the high frequencies, while the low (audible) frequencies are left free for regular telephone communication. Asymmetric Digital Subscriber Line ("ADSL") is the most commonly installed variety of DSL, and typically ranges from 256 kbit/s to 20 Mbit/s downstream. Very-high-bit-rate digital subscriber line ("VDSL") is a DSL standard that provides rate up to 52 Mbit/s downstream. VDSL is capable of supporting high-definition television, as well as telephone services and general Internet access over a single physical connection. VDSL2 is a second-generation of VDSL and is able to provide data rates exceeding 100 Mbit/s in both upstream and downstream directions, but the maximum data rate is achieved at a range of about 300 m and degrades as distance increases.

Optical fiber connections all bring data closer to the end user on optical fibers, and are similar to hybrid fiber-coaxial systems used to provide cable Internet access. Optical fiber offers much higher data rates over relatively longer distances.

Wireless ("Wi-Fi") Internet service providers typically employ low-cost IEEE 802.11 Wi-Fi radio systems to link up remote locations over great distances.

Mobile broadband refers to wireless Internet access delivered through mobile phone towers.

Many devices today provide network adaptors that allow users to connect to the Internet via more than one of these network access points. However, user input may be required to establish an Internet connection using a given adaptor from a set of adaptors. Thus, it is desirable to provide a gateway that provides the ability to manage multiple network adaptors in a way that maintains a reliable connection to the Internet among the various network adaptors without the need for intervention by the user.

SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Certain aspects involve an advanced communication computer. The advanced communication computer includes a processor and at least one network adaptor connected to the processor. The network adaptor includes a separate processor. The network adaptor can communicate with at least one remote network. The processor that is connected to the network adaptor can identify an expected performance level of the adaptor. The processor can also collect actual performance data from the separate processor of the network adaptor. The processor can identify a deviation from the expected performance level based on a comparison between the actual performance data and the expected performance level.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "forward," "aft," "up," "down," "top," "left," "right," "front," "back," and "corners," among others are intended to refer to the orientation as illustrated and described in the figure (or figures) to which the components and directions are referencing.

Certain aspects and features of the present invention relate to an advanced communication computer 100. In some aspects, the advanced communication computer can be a high-performance gateway or other suitable computing system for managing network traffic across multiple upstream LAN connections, handling LAN connections that fail or that may become unreliable, and managing LAN connections that may become available, and then become unavailable. Some or all of these operations can be performed without the need to restart the advanced communication computer 100.

Figure 1:
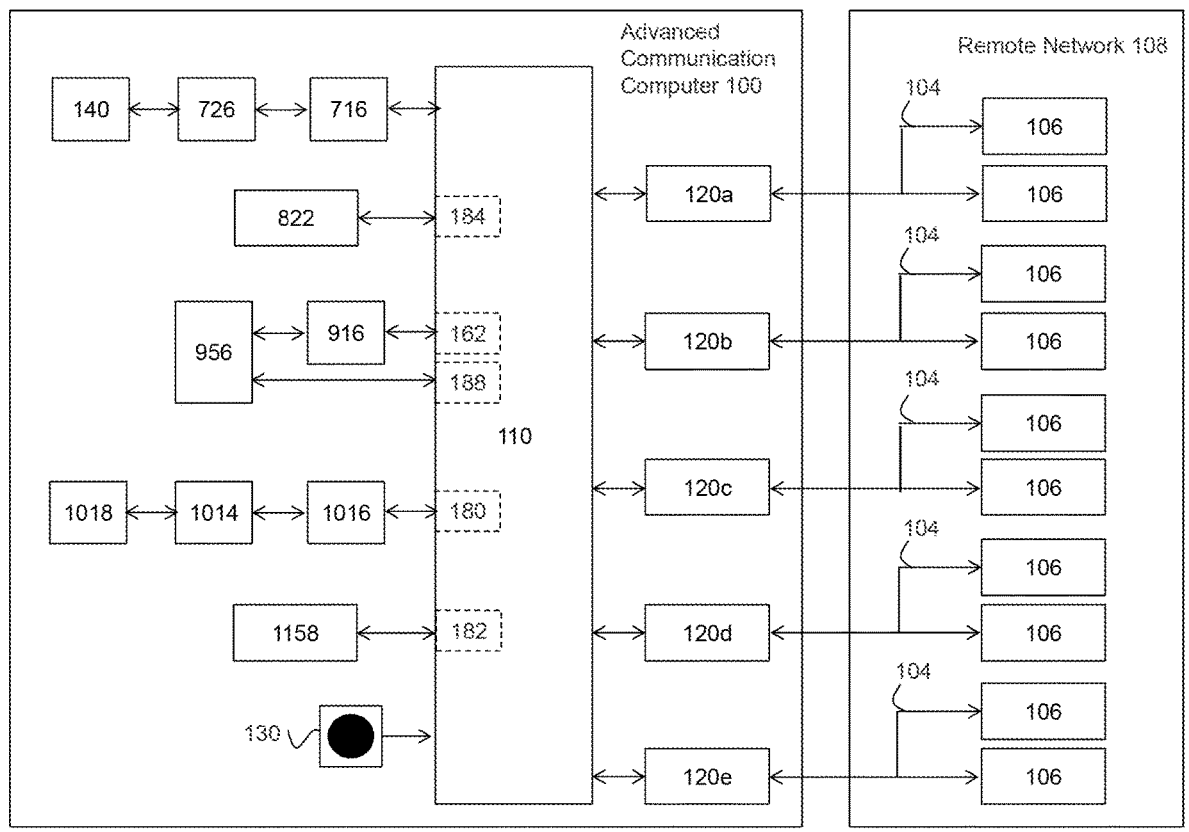
FIG. 1 is a block diagram of an advanced communication computer connected to a remote network, according to certain embodiments of the present invention.

Certain embodiments of the advanced communication computer 100 are shown in FIG. 1. The advanced communication computer 100 comprises a processor 110 connected to at least one local network adaptor 120, which provides a connection to an upstream network 104, which can be a LAN, a WAN, or some combination thereof. In some embodiments, the processor 110 can be a multicore processor. The advanced communication computer 100 is designed to be able to access any number of local network adaptors 120 for multiple parallel upstream connections. An upstream connection can be, for example, a data connection that provides access to the Internet, either directly or through one or more intermediary networks. Each data connection described herein can include a wired connection (e.g., via an Ethernet cable), a wireless connection (e.g., between different wireless RF transceivers), or a combination of wired and wireless connections. In certain embodiments, as shown in FIG. 1, the advanced communication computer 100 includes five local network adaptors 120a-120e, but this is merely one exemplary embodiment, and various embodiments may include one, two, three, four, five, or more local network adaptors 120.

Each local adaptor 120 is connected to a separate upstream LAN, WAN, or other network 104. While these networks 104 may ultimately connect or communicate with the Internet or some other common remote network 108, the ability to route data via a particular connection to a selected server 106 establishes the use or disuse of a particular adaptor 120.

In additional or alternative embodiments, the advanced communication computer 100 can provide channel aggregation and information splitting functionality. For instance, the advanced communication computer 100 can provide, manage, or otherwise use multiple network interfaces (e.g., four wireless network interfaces and four LTE 4G modems). The advanced communication computer 100 can aggregate or split communication channels via these interfaces to selectively provide an amount of bandwidth required by applications being executed on the advanced communication computer 100. The advanced communication computer 100 can also implement various communication functions such as hardware packet acceleration, security acceleration, and audio and video bridging.

In some embodiments, the advanced communication computer 100 can support multiple Ethernet channels (e.g., two 10 Gbps Ethernet channels are controlled by a KeyStone II and a Cortina CS4315). These channels are configurable for multi-mode small form-factor pluggable ("SFP") communications. A suitable gateway module (e.g., a Lantiq VRX220) can provide a VDSL and ADSL capability with auto-failback.

In some embodiments, the advanced communication computer 100 can also support various functions such as data security, data streaming, and home automation. To provide data security, the advanced communication computer 100 can include multiple, independently operating central processing units ("CPU's") or other processing devices. The CPU's can be communicatively coupled via serial ports or other suitable communication interfaces within the advanced communication computer. These communicative couplings can allow one CPU to monitor one or more other CPU's for external tampering, firmware attacks, or other issues that may impact security or stability.

Wi-Fi Network Adaptor

Figure 2:
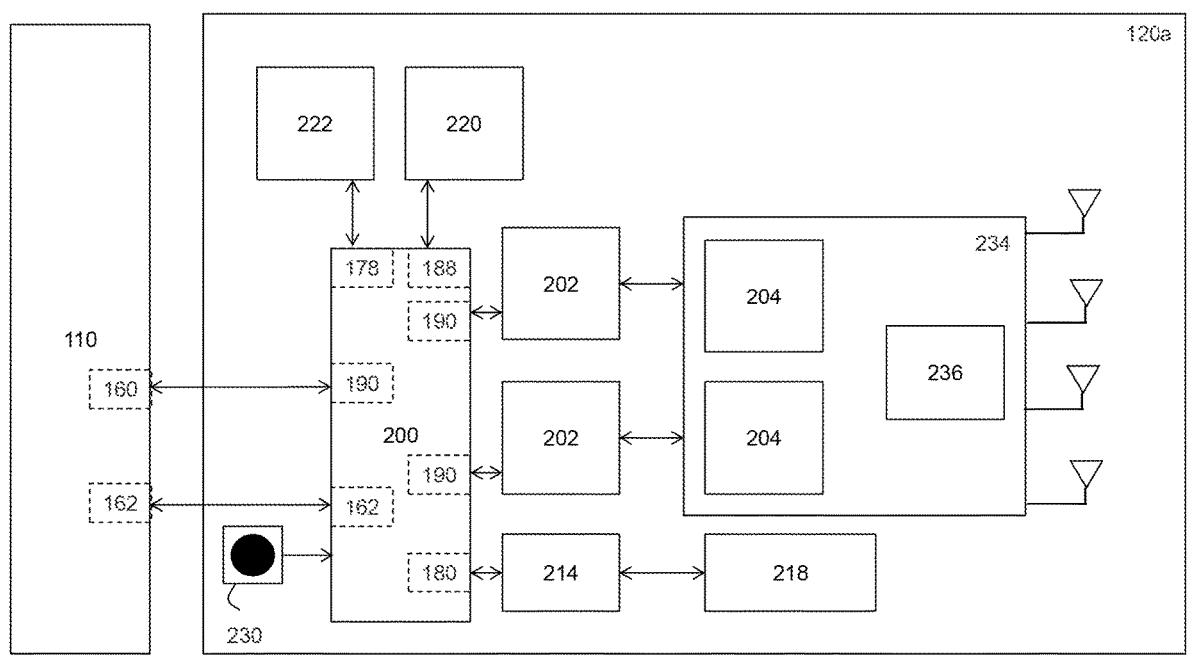
FIG. 2 is a block diagram illustrating a Wi-Fi network adaptor of the advanced communication computer of FIG. 1.

As illustrated in FIG. 2, the local network adaptor 120a may comprise a Wi-Fi network adaptor. The adaptor 120a may comprise a dual core system-on-chip ("SOC") 200. In certain embodiments, the SOC 200 may be an Armada 385 Dual Processor, which is a high-performance integrated controller. The SOC 200 comprises a plurality of serializer/deserializer ("SERDES" or "SRD") interfaces 190, at least one double data rate type three synchronous dynamic random-access memory ("DDR3 SDRAM") interface 188, at least one NAND flash interface 178, at least one inter-integrated circuit ("I²C" or "I2C") interface 162, and at least one universal asynchronous receiver/transmitter ("UART") interface 180.

At least two of the SRD interfaces 190 within the SOC 200 may be connected to edge card connectors 202, which convert data between serial data and parallel interfaces in each direction. These SRD interfaces 190 provide data transmission over a single/differential line in order to minimize the number of I/O pins and interconnects. In certain embodiments, the connection between the SRD interfaces 190 and the edge card connectors 202 is via peripheral component interconnect express ("PCIe" or "PCI-e") 2.0 (×1) connection. In certain embodiments, the edge card connectors 202 may be Conn Edge Card 52 POS. These edge card connectors 202 may in turn be connected to a wireless adaptor module 234, such as a SAM1-L1-Wi-Fi 802.11 a/b/g/n/ac PCIe external module. In certain embodiments, the connection between the edge card connectors 202 and the wireless adaptor module 234 is via mini PCIe (×1).

The wireless adaptor module 234 includes at least two WLAN SOCs 204, such as an Integrated Mac/Baseband/RF 4×4 MIMO and a diplexer 236, such as a radio frequency ("RF") (PA+LNA+Diplexer).

In certain embodiments, the DDR3 SDRAM interface 188 is connected to two DDR3 SDRAM chips 220 (512 MB), and may include as many as 8 DDR3 SDRAM interfaces 188 connected to as many as 16 DDR3 SDRAM chips 220.

In certain embodiments, the NAND flash interface 178 is connected to a NAND flash memory chip 222, and may include as many as 8 NAND flash interfaces 178 connected to 8 NAND flash memory chips 222.

In certain embodiments, the UART interface 180 is connected to a transceiver 214 with auto shutdown, such as MAX3221ECPWR. If the transceiver 214 does not sense a valid signal level on the receiver input, the on-board power supply and drivers shut down. If the transceiver 214 subsequently senses a valid signal level on any receiver input, the on-board power supply and drivers are powered on. The transceiver 214 is in turn connected to a connector 218, which may be a 3 PIN header, for a serial console connection.

The SOC 200 further comprises a reset button 230, which allows the Wi-Fi network adaptor 120a to be restarted independently of the processor 110.

The Wi-Fi network adaptor 120a is connected to the advanced communication computer 100 via at least two connections. One of the connections is provided by the I2C interface 162 on the SOC 200 and a corresponding I2C interface 162 on the processor 110. The I2C interface 162 is used for attaching lower-speed peripherals to processors on computer motherboards and embedded systems. The other connection is provided by the SRD interface 190 on the SOC 200 and one of a plurality of serial gigabit media-independent interfaces ("SGMII") 160 on the processor 110. The SGMII is an interface used to connect a media access control ("MAC") block to a physical layer ("PHY") chip at speeds up to 1 Gbit/s.

1G Ethernet Network Adaptor

Figure 3:
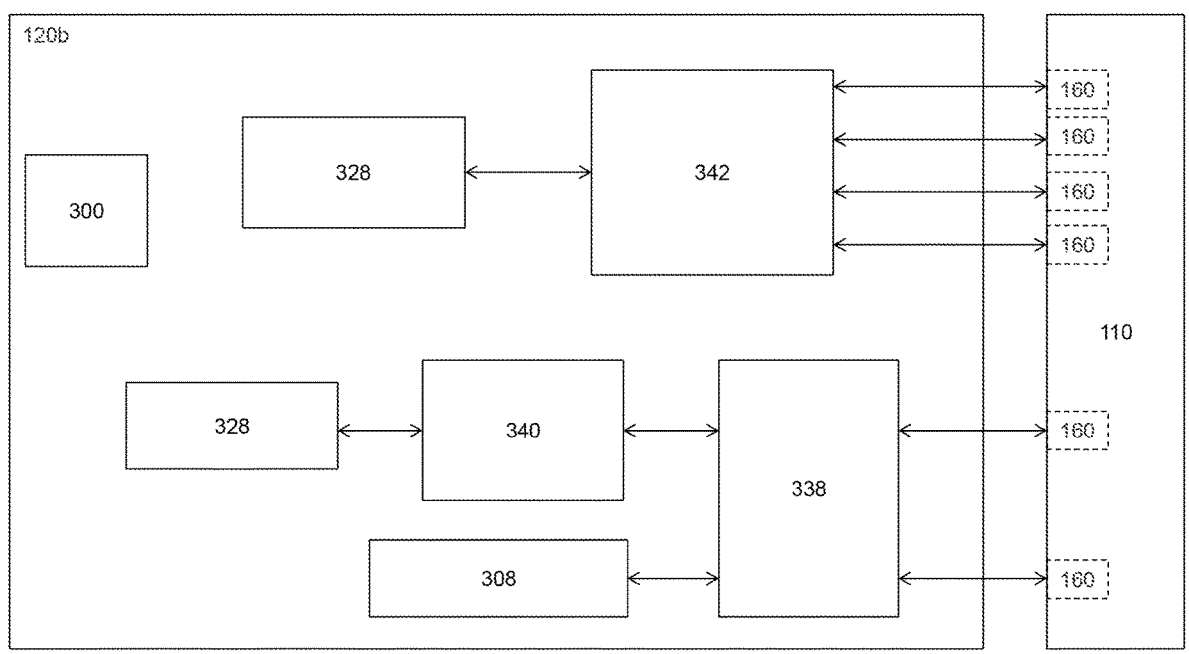
FIG. 3 is a block diagram illustrating a 1G Ethernet network adaptor of the advanced communication computer of FIG. 1.

As illustrated in FIG. 3, the local network adaptor 120b may comprise a 1G Ethernet network adaptor. The adaptor 120b may comprise a processor 300 and a LAN switch 338. The processor 300 is separate from the processor 110. The processor 300 can be communicatively coupled to one or more of the other components of the local network adaptor 120b depicted in FIG. 3. The communicative coupling (not depicted in FIG. 3) can be implemented in any suitable manner (e.g., via conductive leads or traces of a printed circuit board).

The processor 300 can control one or more components of the network adaptor 120b depicted in FIG. 3. For example, the processor 300 can monitor information about one or more components of the network adaptor 120b, transmit the information to the processor 110, and activate or deactivate one or more components of the network adaptor 120b based on control signals received from the processor 110.

In certain embodiments, two ports from the LAN switch 338 are connected to two 1G single PHY transceivers 340. Outputs from the two 1G single PHY transceivers 340 may be connected to a dual Registered Jack ("RJ")-type interface or LAN port 328 for computer networking specifications, such as an RJ45 connector.

In certain embodiments, two ports from the LAN switch 338 are connected to two 1G single PHY transceivers 340. The two 1G single PHY transceivers 340 may in turn be connected to an expansion connector 308.

The adaptor 120b may also comprise a SGMII PHY Quad Port transceiver 342. Four ports from the transceiver 342 may in turn be connected to two dual RJ-type interfaces or LAN ports 328 for computer networking specifications, such as a RJ45.

The 1G Ethernet network adaptor 120b is connected to the advanced communication computer 100 via at least 6 connections. Two of the connections are between the LAN switch 338 and two of the plurality of SGMIIs 160 on the processor 110, which are connected at speeds up to 1 Gbit/s. Four of the connections are between the transceiver 342 and four of the plurality of SGMIIs 160 on the processor 110, which are also connected at speeds up to 1 Gbit/s.

ADSL/VDSL2+ Network Adaptor

Figure 4:
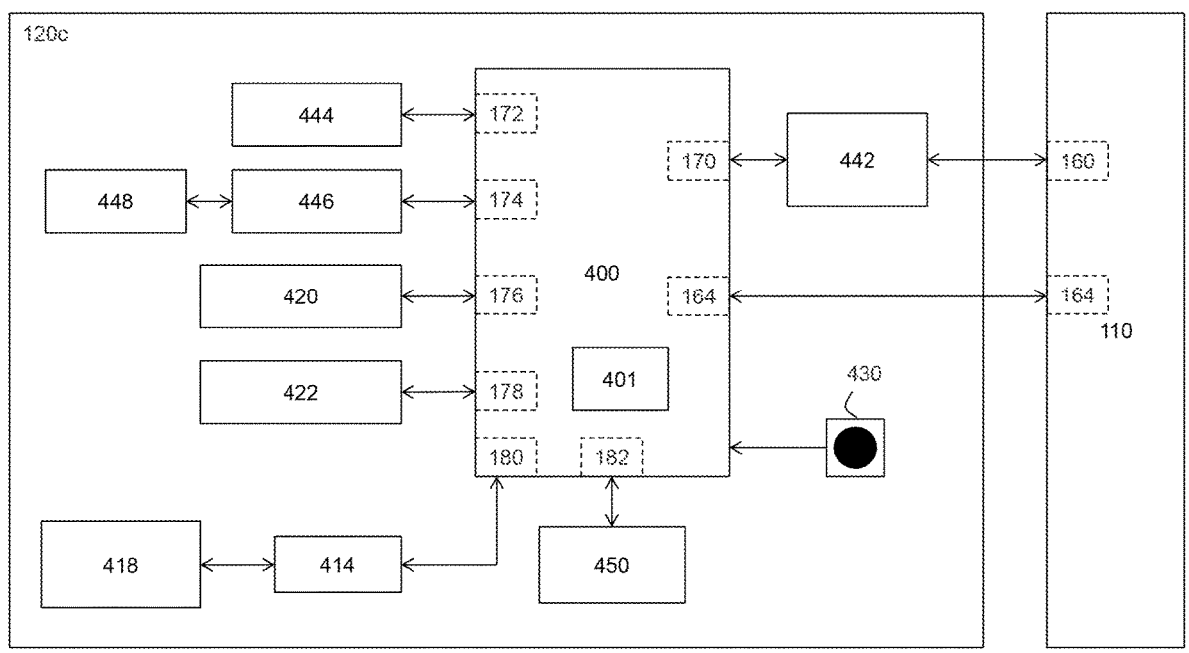
FIG. 4 is a block diagram illustrating a ADSL/VDSL2+ network adaptor of the advanced communication computer of FIG. 1.

As illustrated in FIG. 4, the local network adaptor 120c may comprise an Asymmetric Digital Subscriber Line ("ADSL")/Very-high-bit-rate Digital Subscriber Line ("VDSL") 2+ network adaptor. In certain embodiments, the adaptor 120c comprises a chipset 400. In certain embodiments, the chipset 400 may be a VDSL2/ADSL2+ Analog Front End ("AFE")+ Discrete Multi-Tone ("DMT") chipset. The chipset 400 comprises at least one USB 2.0 interface 172, at least one AFE+DMT (Decision Feedback Equalizer ("DFE")) interface 174, at least one DDR2 SDRAM interface 176, at least one NAND flash interface 178, at least one UART interface 180, at least one joint test action group ("JTAG") interface 182, at least one serial peripheral interface ("SPI") 164, and at least one Gbit PHY ("GPHY") interface 170.

The USB 2.0 interface 172 may be connected to a USB Mini Host Connector 444.

The AFE+DMB (DFE) interface 174 may be connected to an external line driver 446, which may in turn be connected to a RJ-type interface 448 or other standardized telecommunication network interface, such as a RJ11.

In certain embodiments, the DDR2 SDRAM interface 176 is connected to a DDR2 SDRAM chip 420.

In certain embodiments, the NAND flash interface 178 is connected to a NAND flash memory chip 422 (1 Gb).

In certain embodiments, the UART interface 180 is connected to a transceiver 414 with auto shutdown, such as MAX3221. If the transceiver 414 does not sense a valid signal level on the receiver input, the on-board power supply and drivers shut down. If the transceiver 414 subsequently senses a valid signal level sensed at any receiver input, the on-board power supply and drivers are powered on. The transceiver 414 is in turn connected to a connector 418, which may be a 3 PIN header, for a serial console connection.

The JTAG interface 182 may be connected to a JTAG connector 450.

The GPHY interface 170 may be connected to a GPHY-to-SGMII converter 442.

The ADSL/VDSL2+ network adaptor 120c is connected to the advanced communication computer 100 via at least two connections. One of the connections is between the converter 442 and one of the plurality of the SGMIIs 160 on the processor 110, which is connected at speeds up to 1 Gbit/s. The other connection is between the SPI interface 164 on the chipset 400 and one of the SPI interfaces 164 on the processor 110.

The chipset 400 further comprises a reset button 430, which allows the ADSL/VDSL2+ network adaptor 120c to be restarted independently of the processor 110.

In some embodiments, the chipset 400 also includes a processor 401 that is separate from the processor 110. The processor 401 can be communicatively coupled to one or more of the other components of the local network adaptor 120c depicted in FIG. 4. The communicative coupling (not depicted in FIG. 4) can be implemented in any suitable manner (e.g., via conductive leads or traces of a printed circuit board). In additional or alternative embodiments, the processor 401 can be separate from the chipset 400 and can be communicatively coupled to components of the local network adaptor 120c in any suitable manner.

The processor 401 can control one or more components of the network adaptor 120c depicted in FIG. 4. For example, the processor 401 can monitor information about one or more components of the network adaptor 120c, transmit the information to the processor 110, and activate or deactivate one or more components of the network adaptor 120c based on control signals received from the processor 110.

10G Ethernet Network Adaptor

Figure 5:
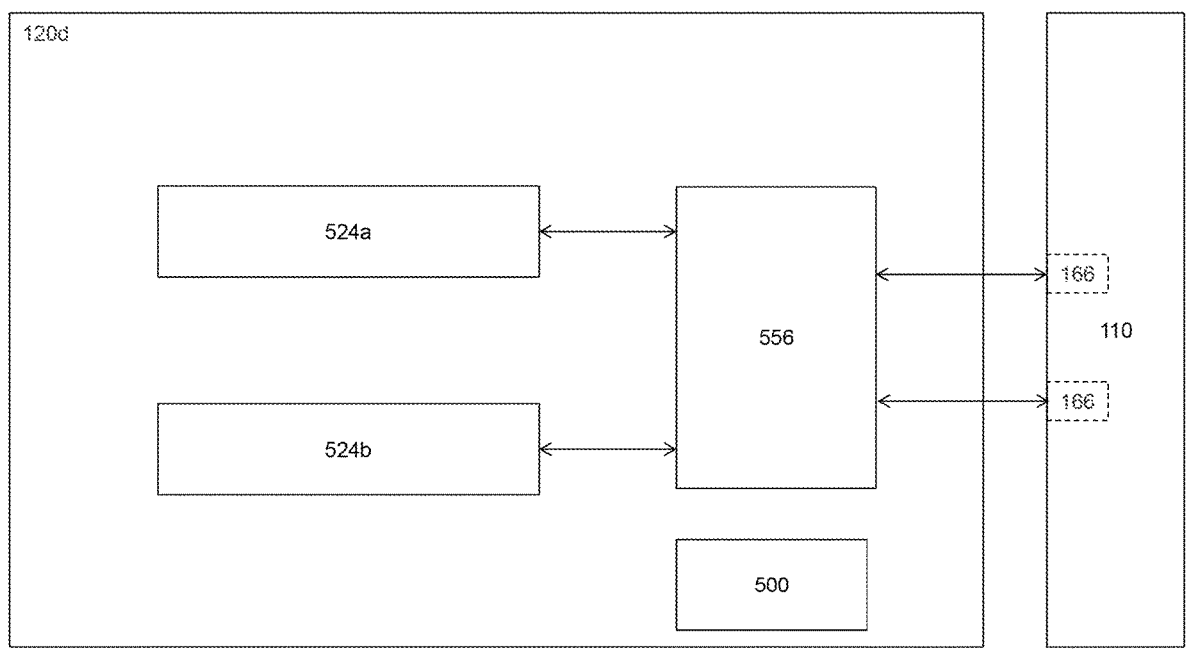
FIG. 5 is a block diagram illustrating a 10G Ethernet network adaptor of the advanced communication computer of FIG. 1.

As illustrated in FIG. 5, the local network adaptor 120d may comprise a 10G Ethernet network adaptor. The adaptor 120d may comprise an electronic dispersion compensation ("EDC") device 556, such as a programmable dual port small form-factor pluggable ("SFP") transceivers+PHY with integrated EDC and processor-enabled SFP+10 Gbase-SR/LR/LRM. The EDC device supports two full duplex 10G links, in which both transmit and receive paths include clock and data recovery ("CDR") circuits.

The EDC device 556 is connected to an SFP/SFP+ Optical Connector 524a, and a SFP+ Copper twin-ax Connector 524b. These connections utilize an SFI interface, which includes a single lane data channel and 64b/66b encoding.

The 10G Ethernet network adaptor 120d is connected to the advanced communication computer 100 via at least two connections. Both connections are between the EDC device 556 and two 10 Gbit small form-factor pluggable ("XFP" or "XFI") interfaces 166 on the processor 110, which are connected at speeds up to 10 Gbit/s.

In some embodiments, the 10G Ethernet network adaptor 120d also includes a processor 500 that is separate from the processor 110. The processor 500 can be communicatively coupled to one or more of the other components of the local network adaptor 120d depicted in FIG. 5. The communicative coupling (not depicted in FIG. 5) can be implemented in any suitable manner (e.g., via conductive leads or traces of a printed circuit board). The processor 500 can control one or more components of the 10G Ethernet network adaptor 120d depicted in FIG. 5. For example, the processor 500 can monitor information about one or more components of the 10G Ethernet network adaptor 120d, transmit the information to the processor 110, and activate or deactivate one or more components of the 10G Ethernet network adaptor 120d based on control signals received from the processor 110.

4G LTE/USB Network Adaptor

Figure 6:
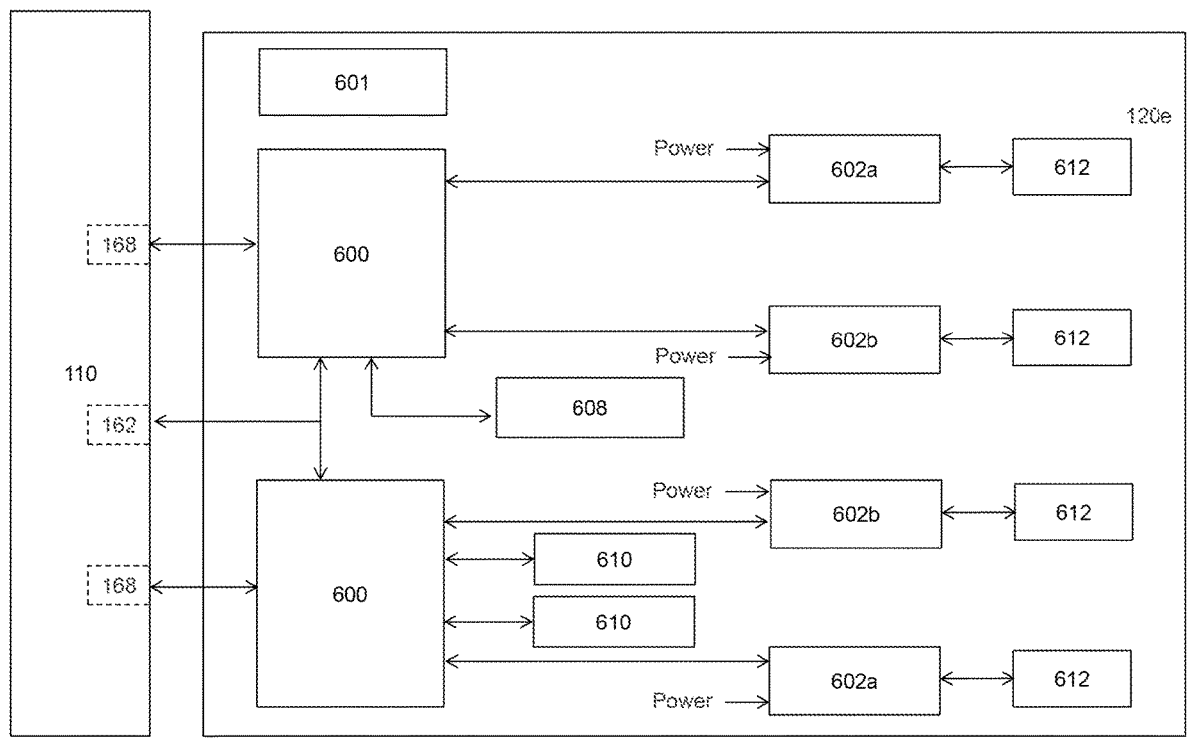
FIG. 6 is a block diagram illustrating a 4G LTE/USB network adaptor of the advanced communication computer of FIG. 1.

As illustrated in FIG. 6, the local network adaptor 120e may comprise a 4G LTE/USB network adaptor. The adaptor 120e may comprise at least two USB 3.0 hubs 600. Each hub 600 is connected to a real PCIe socket 602a and a PCIe socket (for external modem) 602b. These connections are via USB 2.0 interfaces. A power input is also provided for each of the real PCIe sockets 602a and the PCIe sockets 602b.

Each of the real PCIe sockets 602a and the PCIe sockets 602b may in turn be connected to a subscriber identity module ("SIM") connector 612, which is configured to connect to a SIM card, a portable memory chip that operates on the Global System for Mobile Communications ("GSM") network.

One of the USB 3.0 hubs 600 is also connected via 2 USB 3.0 interfaces to an expansion connector 608. The other USB 3.0 hub 600 is connected to a pair of USB 3.0 connectors 610. One of the USB 3.0 connectors 610 may be connected to a USB flash drive, and the other USB 3.0 connector 610 may be configured for external access.

The 4G LTE/USB network adaptor 120e is connected to the advanced communication computer 100 via at least three connections. Two of the connections are between each USB 3.0 hub 600 and one of the USB 3.0 interfaces 168 on the processor 110, which are each connected at speeds up to 5 Gbit/s. The third connection is between one of the I2C interfaces 162 on the processor 110 and split between the two USB 3.0 hubs 600.

In some embodiments, the network adaptor 120e also includes a processor 601 that is separate from the processor 110. The processor 601 can be communicatively coupled to one or more of the other components of the local network adaptor 120e depicted in FIG. 6. The communicative coupling (not depicted in FIG. 6) can be implemented in any suitable manner (e.g., via conductive leads or traces of a printed circuit board).

The processor 601 can control one or more components of the network adaptor 120e depicted in FIG. 6. For example, the processor 601 can monitor information about one or more components of the network adaptor 120e, transmit the information to the processor 110, and activate or deactivate one or more components of the network adaptor 120e based on control signals received from the processor 110.

User Interface Board

Figure 7:
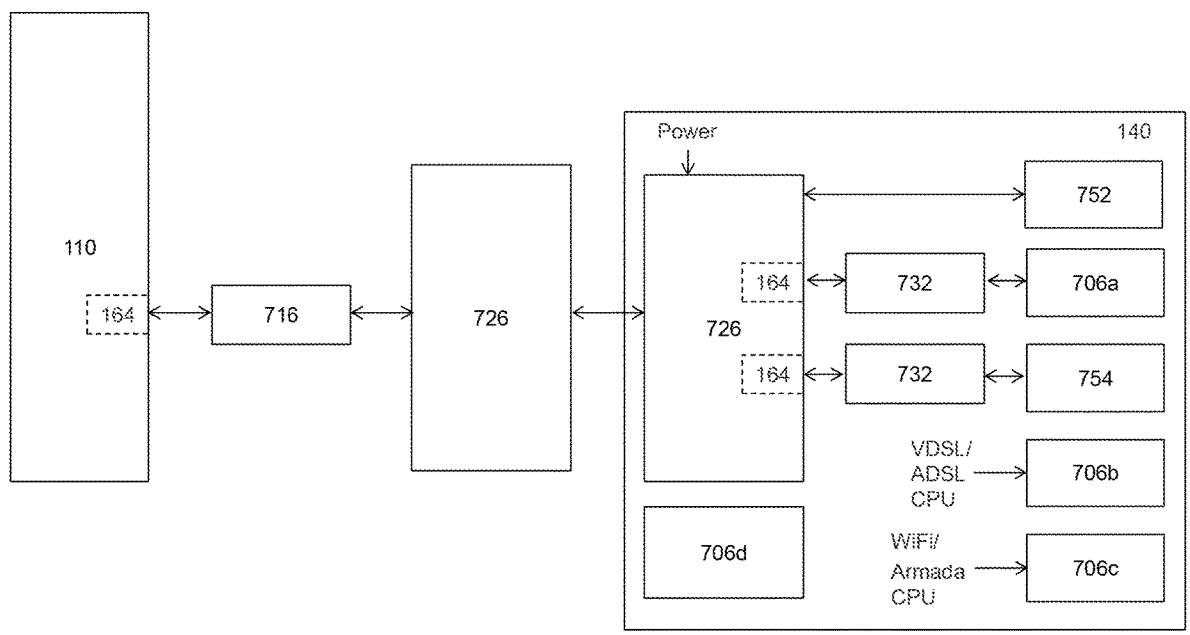
FIG. 7 is a block diagram illustrating a user interface board of the advanced communication computer of FIG. 1.

As illustrated in FIG. 7, the advanced communication computer 100 may further comprise a user interface board 140. The board 140 may comprise a connector 726, such as a CONN FPC 20-Pin connector. A power input may be provided to the connector 726. The connector 726 also comprises a plurality of SPI interfaces.

One of these SPI interfaces is connected to an LCD 752, such as a 12×32 Pixel LCD, with a connection having a voltage of 3.3 V. Two additional SPI interfaces on the connector 726 are each connected to an SPI to an 10 expander 732. One of these expanders 732 may in turn be connected to user LEDs 706a. The other expander 732 may in turn be connected to configuration push buttons 754.

The board 140 may further comprise status LEDs 706b for the ADSL/VDSL2+ network adaptor 120c, which are connected to a CPU for the ADSL/VDSL2+ network adaptor 120c. The board 140 may further comprise status LEDs 706c for the Wi-Fi network adaptor 120a, which are connected to a CPU for the Wi-Fi network adaptor 120a. The board 140 may further comprise a power indication LED 706d.

The board 140 is connected to the advanced communication computer 100 via a series of connections between the board 140 and a second connector 726, a level translator 716, and one of the SPI interfaces 164 on the processor 110.

The SPI interface 164 is connected to the level translator 716 with a connection having a voltage of 1.8V. The level translator 716 may convert this voltage to 3.3V, so that the connection between the level translator 716 and the second connector 726 is at the higher voltage level. The second connector 726 is then connected to the connector 726 on the board 140 via a flexible cable connection.

Other Components

As illustrated in FIG. 1, the advanced communication computer 100 may further comprise an additional NAND flash memory chip 822, which is connected directly to an extended memory interface ("EMIF") 16 184 on the processor 110.

One of the I2C interfaces 162 may be connected to another level translator 916 with a connection having a voltage of 1.8V. The level translator 916 may convert this voltage to 3.3V. A connection between the level translator 916 and a 204-Pin DDR3 SO-DIMM connector 956 is provided at the higher voltage level. The connector 956 is also connected directly to the processor 110 via one of the DDR3 interfaces 188. The connector 956 provides unbuffered signal processing.

In certain embodiments, a UART interface 180 on the processor 110 is connected to another level translator 1016, which is in turn connected to a transceiver 1014 with auto shutdown, such as MAX3221. If the transceiver 1014 does not sense a valid signal level on the receiver input, the on-board power supply and drivers shut down. If the transceiver 1014 subsequently senses a valid signal level on any receiver input, the on-board power supply and drivers are powered on. The transceiver 1014 is in turn connected to a connector 1018, which may be a 3 PIN header, for a serial console connection.

In some embodiments, a JTAG interface 182 on the processor 110 is connected to an HDR-20 Pin connector 1158, which may be used for debugging the processor 110.

The processor 110 further comprises a reset button 130, which allows the processor 110, and thus the entire advanced communication computer 100 to be restarted.

Optimizing Connection to Remote Network

The processor 110 and the various adaptors 120 are configured so that the processor 110 is knowledgeable of the expected performance level of each network adaptor 120, and collects actual performance data from each network adaptor 120. The processor 110 compares the actual performance data to the expected performance levels to identify issues with signal condition, network traffic, interference, and other similar metrics.

If the processor 110 identifies a problem with a particular network adaptor 120, the processor 110 is configured to communicate with the processor within that particular network adaptor 120 to reboot or to take other corrective measures in an attempt to correct the issue with the performance level. Because each network adaptor 120 is configured with its own controller, the processor 110 is able to shut down and restart particular network adaptors 120 without interfering with the operation of the other network adaptors 120. In other words, the processor 110 coordinates and oversees the operation of each network adaptor 120 to ensure a continuous and uninterrupted network connection, but each individual network adaptor 120 is configured to operate independently without the processor 110 if needed.

The processor 110 also has the ability to divert the connection to the remote network 108 to another network adaptor 120 if the processor 110 identifies an improved performance level on the other network adaptor 120.

Encrypted Communication

Because the processor 110 may be able to access the remote network 108 through more than one network adaptor 120, the processor 110 may utilize one network adaptor 120 to send encrypted communication to a recipient location, and utilize another network adaptor 120 to send an encryption key to the recipient location. The recipient location would then decrypt the communication with the encryption key at the destination. Interception of the transmission on one of the connections would not provide the information needed to decrypt the communication, thus providing an added layer of encryption for sensitive communication.

Modular Configurations

The advanced communication computer 100 may be assembled with all of the optional network adaptors 120, as shown in FIG. 1. Such applications for this type of application may include complex or high-end applications where a full range of connectivity options are needed or desired.

In other embodiments, the advanced communication computer 100 may include a base unit version that includes the processor 110 and one network adaptor 120, which may be selected depending on the availability and choice of internet service providers in a particular location.

For example, in some embodiments, the advanced communication computer 100 may be configured with an ADSL/VDSL2+ network adaptor 120c for utilization by telecommunications companies as a base unit.

In other embodiments, the advanced communication computer 100 may be configured with a 1G Ethernet network adaptor 120b and/or with a 10G Ethernet network adaptor 120d for utilization by cable providers as a base unit.

In yet other embodiments, the advanced communication computer 100 may be configured with a 4G LTE/USB network adaptor 120e for utilization by cellular service providers as a base unit.

In still other embodiments, the advanced communication computer 100 may be configured with a Wi-Fi network adaptor 120a for utilization in areas that provide a wireless wide area network as a base unit.

Add-on units comprising other network adaptors 120 may be combined with each type of advanced communication computer 100 base unit to provide additional connectivity options. The add-on units may comprise a processor 110 (i.e., may be configured as a base unit, but the processor 110 in the add-on unit acts as a slave processor 110 when attached to an existing base unit having a processor 110 that acts as a master processor 110) and/or may be configured with the network adaptor 120 only (so that the add-on units cannot be used as stand-alone advanced communication computer 100 base units).

In these embodiments, additional add-on units may be combined with the base unit until the full design of the advanced communication computer 100 shown in FIG. 1 is achieved.

In some aspects, the advanced communication computer 100 can include multiple, independently operating processors (e.g., processors 110, 300, 401, 500, 601) that are connected or otherwise communicatively coupled via an independent interface. The independent interface can be a serial or other suitable non-LAN or non-WAN interface. The one or more of the independently operating processors can monitor one or more other independently operating processors for changes in firmware, data leakage, or other events or parameter changes.

The inter-processor monitoring can reduce or prevent hacking or other compromises of the advanced communication computer 100. For example, successful attempt to control the advanced communication computer 100 in an unauthorized manner would require control of some or all of the independently operating processors simultaneously or near simultaneously. In aspects involving the inter-processor monitoring described above, each processor can store, in firmware, copies of each other processor's firmware. In this configuration, a successful system update (e.g., an update of all processors with the proper data about each other processor's firmware) is difficult or impossible without a proper hardware key. Thus, a first processor can restore a second processor's firmware in response to detecting a manipulation of the second processor's firmware (e.g., determining a difference between the second processor's firmware version or other characteristics as stored by the first processor and the second processor's firmware version or other characteristics as detected by the first processor).

Figure 8:
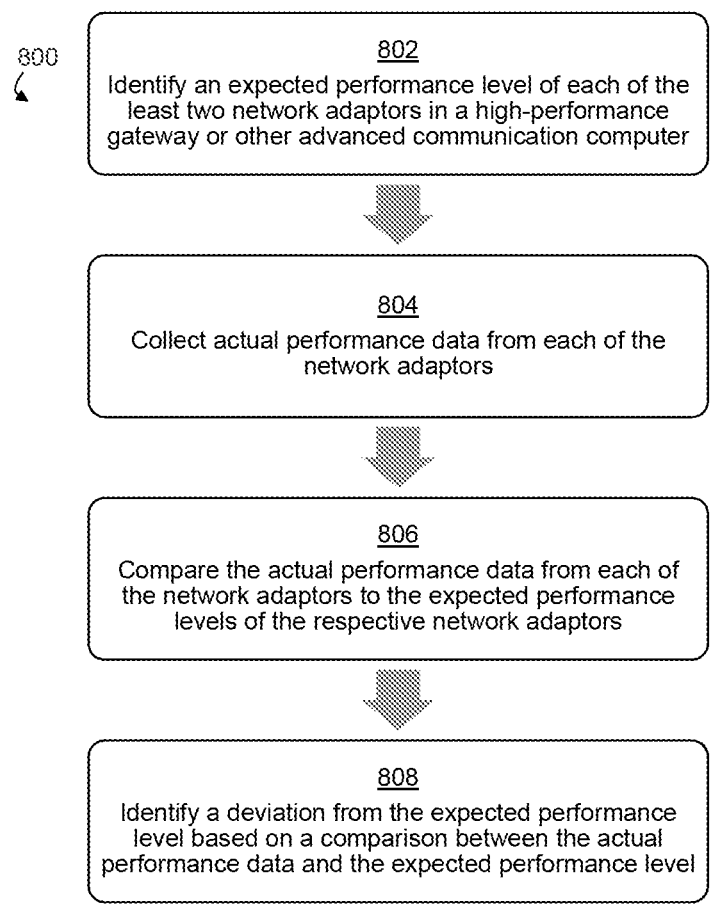
FIG. 8 is a flow chart illustrating an example of a process for identifying deviations from expected performance levels in network adaptors of the advanced communication computer of FIG. 1.

FIG. 8 is a flow chart illustrating an example of a process 800 for identifying deviations from expected performance levels in network adaptors of the advanced communication computer 100. For illustrative purposes, the process 800 is described using the implementations described above with respect to FIGS. 1-7. However, other implementations are possible.

The process 800 includes identifying an expected performance level for each of at least two network adaptors in an advanced communication computer 100 (e.g. a high-performance gateway), as depicted at block 802. For example, the processor 110 or another suitable processing device can execute instructions stored in a non-transitory computer-readable medium to perform one or more operations for implementing block 802. The operations can include accessing data from a database or other data structure that is stored in a computer-readable medium and that includes data describing or otherwise indicating performance levels for different types of network adaptors, such as the network adaptors 120a-120e described above with respect to FIGS. 1-7.

In some aspects, the processor 110 or another suitable processing device identifies the expected performance level in response to detecting or otherwise determining that a given network adaptor has been communicatively coupled to the processor 110. For example, the processor 110 can periodically monitor each port or other interface that may be used to physically connected a given network adaptor to the advanced communication computer 100. If the processor 110 detects the presence of a new network adaptor at the port or other interface, the processor 110 can send a message to a separate processor of the network adaptor (e.g., the SOC 200, the processor 300, the processor 401, etc.). The message can request that the separate processor identify one or more relevant features of the network adaptor (e.g., a model number, manufacturer, device type, etc.). The processor 110 can receive a responsive message from the separate processor with the requested information about the network adaptor. The processor 110 can use the requested information to access data in a database or other data structure that describes or otherwise indicates a corresponding device profile for the new network adaptor. The processor 110 can identify the expected performance level from the device profile.

An expected performance level can involve any suitable metrics for a network adaptor. Examples of these metrics include (but are not limited to) metrics describing signal conditions, network traffic, interference levels, etc.

The process 800 also includes collecting actual performance data from each of the network adaptors, as depicted at block 804. For example, the processor 110 or another suitable processing device can execute instructions stored in a non-transitory computer-readable medium to perform one or more operations for implementing block 804. The operations can include, for example, configuring a suitable interface device of the advanced communication computer 100 to transmit messages from the processor 110 to separate processors (e.g., the SOC 200, the processor 300, the processor 401, etc.) of the connected network adaptors. The messages can request that the separate processors provide data regarding the performance of their respective network adaptors. A suitable interface device of the advanced communication computer 100 can receive responsive messages from the separate processors. The responsive messages can include the data regarding the performance of the various network adaptors. The processor 110 can store the received data in a suitable computer-readable medium The process 800 also includes comparing the actual performance data from each of the network adaptors to the expected performance levels the respective network adaptors, as depicted at block 806. For example, the processor 110 or another suitable processing device can execute instructions stored in a non-transitory computer-readable medium to perform one or more operations for implementing block 806. The operations can include retrieving stored metrics about a performance level for a given network adaptor and comparing the stored metrics to example metrics in a device profile for the network adaptor.

The process 800 also includes identifying a deviation from the expected performance level based on a comparison between the actual performance data to the expected performance level, as depicted at block 808. For example, the processor 110 or another suitable processing device can execute instructions stored in a non-transitory computer-readable medium to perform one or more operations for implementing block 808. The operations can include, for example, determining that metrics for one or more of signal conditions, network traffic, interference levels, etc. with respect to a given network adaptor indicate a performance level that does not satisfy the expected performance level. For example, the metrics may indicate that actual network traffic speeds or throughput levels are less than threshold network traffic speeds or throughput levels corresponding to the expected performance level.

In some aspects, the processor 110 or another suitable processing device can perform one or more corrective measures based on identifying a deviation from an expected performance level using the process 800. For example, the processor can configure a suitable interface device to transmit control signals to a network adaptor whose performance level deviates from an expected performance level. The control signals can instruct a separate processor of the network adaptor to perform a reboot or other corrective measures as described above. The control signals can be used to implement the corrective measures with respect to one network adaptor without interfering with the operation of other network adaptors. For example, transmitting controls signals to a given network adaptor that instruct that adaptor to reboot itself can confine the rebooting operations to the specific network adaptor rather than requiring a reboot of the advanced communication computer 100 (and the other connected network adaptors).

Any suitable set of processing components can be used in the advanced communication computer 100. For example, FIG. 9 is a block diagram depicting an example of certain processing components of the advanced communication computer 100.

Figure 9:
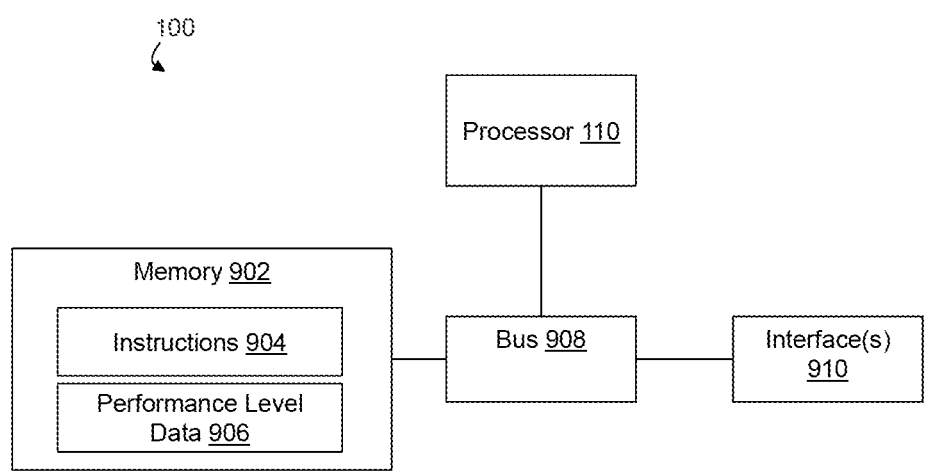
FIG. 9 is a block diagram depicting an example of certain processing components of the advanced communication computer of FIG. 1.

In the example depicted in FIG. 9, the processor 110 is communicatively coupled to a memory 902. The processor 110 can execute computer-executable instructions 904 stored in the memory 902. Executing the instructions 904 by the processor 110 causes the processor 110 to perform the operations described herein. The processor 110 can also access performance level data 906 (e.g., device profiles, expected performance levels, stored metrics about actual performance levels, etc.) and/or other information stored in the memory 902. The processor 110 may include a microprocessor, an application-specific integrated circuit ("ASIC"), a field-programmable gate array ("FPGA"), or another processing device. The processor 110 can include any of a number of processing devices, including one.

The memory 902 can include any suitable computer-readable medium. The computer-readable medium can include any electronic, optical, magnetic, or other storage device capable of providing a processor with computer-readable instructions or other program code. Non-limiting examples of a computer-readable medium include a memory chip, a ROM, a RAM, or any other medium from which a computer processor can read instructions. The instructions may include processor-specific instructions generated by a compiler and/or an interpreter from code written in any suitable computer-programming language, including, for example, C, C++, C #, Visual Basic, Java, Python, Perl, JavaScript, and ActionScript.

The advanced communication computer 100 may also include a bus 908. The bus 908 can communicatively couple one or more components of the advanced communication computer 100.

The advanced communication computer 100 may also include one or more interfaces 910 that can receive data from other components of the advanced communication computer 100 (e.g., different network adaptors) and transmit data to other components of the advanced communication computer 100. The interfaces 910 can include any of the various ports or other interfaces described above with respect to FIGS. 1-8.

Implementation Examples

The advanced communication computer can be implemented in any suitable manner. In one example of an implementation of the advanced communication computer, the advanced communication computer can include a main unit with CPU's such as a TI KeyStone 5 Core CPU (4× Armada, 1×DSP) operating a 2 GHz, a dual core ARM15 Marvell Armada, a Qualcomm MDM9215 (one per each LTE module), and a Lantiq VRX220. In this implementation example, the advanced communication computer can include 8-GB DDR 72 Bit Memory (for TI KeyStone), a Micro SD Card slot for Marvell Armada, a TI Terra Net Bus, 2 TB internal solid-state drive ("SSD") that can be accessible as a network-attached storage device, a graphical backlight LCD Status Display, and any suitable operating system (e.g., Linux). In this example, the advanced communication computer uses VDSL 2/ADSL 2+, with auto fallback and annex a/b configurable features. In this example, the advanced communication computer includes Wi-Fi capability (e.g., quad channel, 802.11 a, b, g, n, ac, 2/4/5 GHz, support for public and private WLAN).

In this example, the advanced communication computer can also provide Bluetooth capability. This can include multi-channel Bluetooth support with support for appropriate Bluetooth standards (e.g., 1.2, 21.1+EDR, 3.0+HS, 3.0 ultra-wide band, 4.0, 4.1, 4.2), dual-mode support, and an LE Secure connection. In this example, the advanced communication computer can include Ethernet capability such as 6×1 GB port, 2×10 GB Port SFP+ twin-ax Cooper or 10 GB Port SFP/SFP+ Fiber (configurable), packet acceleration, and a queue manager In this example, the advanced communication computer can include one or more input/output interfaces. For instance, the advanced communication computer can include one or more internal PCIe slots, one or more internal USB 3 slots (which may be shared with PCIe), one or more external USB 3 slots, and one or more mini SIM card slots (e.g., for an optional LTE/GSM modem).

The advanced communication computer can also include one or more optional modules. One example of these optional modules is an LTE/4G PCIe modem module, which can support various communication protocols (e.g., LTE, HSPA+, DC HSPA+, GSM, EDGE, CDMA, EVDO, etc.). These modules can include GPS functionality. Another example of these optional modules is a satellite PCIe communication module (e.g., Orbcomm ISAT). Another example of these optional modules is a PCIe Bluetooth module (e.g., Bluetooth V4.2, V4.0, V4.0LE, V3.0+HS, 1+EDR). Another example of these optional modules is an independent TV board.

This implementation example is provided for illustrative purposes only. Any of the implementation details in this example can be modified, replaced, or otherwise realized using any suitable device providing the same or similar functionality to the specific examples described above.

Figure 10:
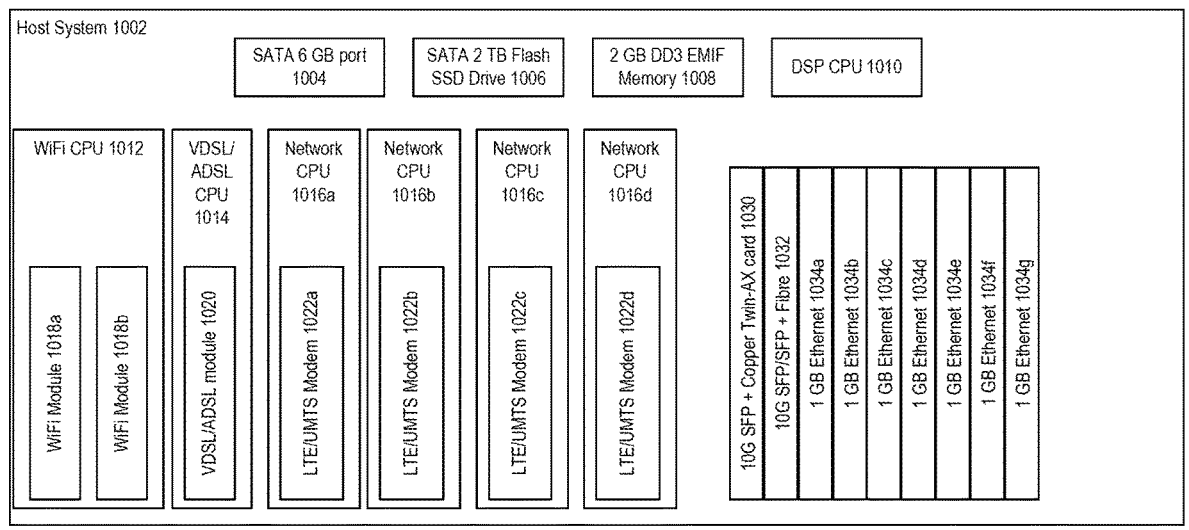
FIG. 10 is a block diagram depicting another example of an implemented advanced communication computer.

Another example of an implementation of the advanced communication computer is depicted in FIG. 10. In this example, the advanced communication computer includes a host system 1002. The host system 1002 can include various ports such as, but not limited to, an SATA 6 GB port 1004. The host system 1002 can also include one or more memory devices, such as an SATA 2 TB Flash SSD Drive 1006 and a 2 GB DD3 EMIF Memory 1008. The host system 1002 can also include a DSP CPU 1010.

The example depicted in FIG. 10 can also include various independently operating CPU's that can monitor one another as described above. The host system 1002 can include a Wi-Fi CPU 1012. An example of the Wi-Fi CPU 1012 is a dual-core ARM 15 CPU dedicated for managing Wi-Fi operations, but other suitable devices can be used for implementing the Wi-Fi CPU 1012. The Wi-Fi CPU 1012 can include or execute Wi-Fi modules 1018a, 1018b. Each of the Wi-Fi modules 1018a, 1018b can communicate using one or more of 2 GHz, 4 GHz, and 5 GHz bandwidth. Each of the Wi-Fi modules 1018a, 1018b can communicate using one or more suitable protocols, such as one or more of 802.11a, 802.11b, 802.11g, 802.11n, and 802.11ac.

Additionally or alternatively, the host system 1002 can include a VDSL/ADSL CPU 1014. An example of the VDSL/ADSL CPU 1014 is a Lantiq 80220 CPU, but other suitable devices can be used for implementing the VDSLJA-DSL CPU 1014. The VDSL/ADSL CPU 1014 can include or execute a VDSL/ADSL modem module 1020. The VDSL/ADSL modem module 1020 can support VDSL2/ADSL2+ SFE/DMT communication.

Additionally or alternatively, the host system 1002 can include network CPU's 1016a-d. An example of a network CPU is a Qualcomm MDM 9215 CPU, but other suitable devices can be used for implementing the network CPU. The network CPU's 1016a-d can respectively include or execute LTE/UMTS modems 1022a-d. Each of the LTE/UMTS modems 1022a-d can support one or more telecommunications protocols such as (but not limited to) LTE (e.g., LTE 2G, 3G, 4G), DC-HSPA+, HSPA+, DC-HSUPA, WCDMA, GSM, GPRS, EDGE, and GNS.

The example depicted in FIG. 10 can also include various network interfaces. The host system 1002 can include a 10G SFP+ Copper Twin-AX card 1030. Additionally or alternatively, the host system 1002 can include a 10G SFP/SFP+ Fibre 1032. Additionally or alternatively, the host system 1002 can include 1 GB Ethernet cards 1034a-g.

Any features of the advanced communication computer depicted in FIG. 10 can be combined with or otherwise implemented using any of the features described herein. This includes the examples described above with respect to FIGS. 1-9.

Figure 11:
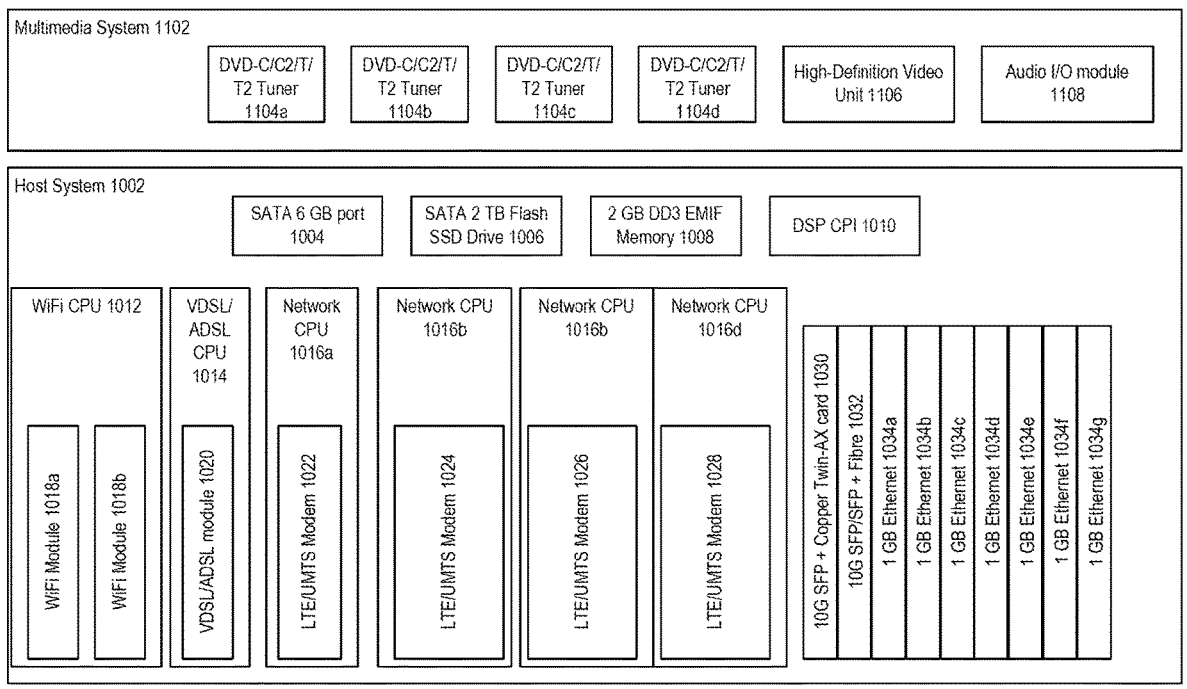
FIG. 11 is a block diagram depicting the advanced communication computer of FIG. 10 with an optional multimedia system.

In some embodiments, the example depicted in FIG. 10 can be augmented with the addition of a multimedia system 1102, as depicted in FIG. 11. The multimedia system 1102 can be communicatively coupled with the host system 1002. The multimedia system 1102 can include DVD-C/C2/T/T2 tuners 1104a-d, a high-definition video unit 1106, and an audio input/output module 1108.

Any features of the advanced communication computer depicted in FIG. 11 can be combined with or otherwise implemented using any of the features described herein. This includes the examples described above with respect to FIGS. 1-10.

The implementation examples depicted in FIGS. 10 and 11 are provided for illustrative purposes only. Any of the implementation details in these examples can be modified, replaced, or otherwise realized using any suitable device providing the same or similar functionality to the specific examples described above.

Supported Applications

In some embodiments, the advanced communication computer described herein (including any of the examples depicted in FIGS. 1-9) can support different types of applications. For example, the advanced communication computer can support a combination of different applications in the same advanced communication computing system.

One example of an application supported by the advanced communication computer is network access with variable bandwidth, channel aggregation, or both. In this application, multiple communication channels are combined to achieve a wider bandwidth, an increased stability in communication channels (e.g., a reduced number of interruptions in communication), or both. For instance, the advanced communication computer can bypass VDSL or ADSL bandwidth problems on demand using one or more LTE 4G modules. Additionally or alternatively, the advanced communication computer can provide network access in areas with wired network communication architecture (e.g., copper or optical fiber installations) by combining satellite communication, LTE 4G communication, or both. Additionally or alternatively, the advanced communication computer can extend network bandwidth by combining VDSL or ADSL with up to two 10 Gigabit copper or fiber lines. Additionally or alternatively, the advanced communication computer can use public Wi-Fi spots to extend bandwidth. Additionally or alternatively, the advanced communication computer can provide network access in moving environments (e.g., on a moving vehicle).

Another example of an application supported by the advanced communication computer is providing a private cloud service. The advanced communication computer can provide a private cloud for authorized users of the advanced communication computer. The private cloud can be accessible over standard Internet connections. Additionally or alternatively, the private cloud can be selectively accessibly over private wired connections (e.g., copper or fiber cable) remotely over satellite, LTE, or other suitable telecommunication networks.

Another example of an application supported by the advanced communication computer is enhanced Wi-Fi Access point functionality. For example, the advanced communication computer can act as a Wi-Fi Access point for multiple Wi-Fi networks (e.g., providing 2, 4, and 5 GHz support for four Wi-Fi networks).

Another example of an application supported by the advanced communication computer is enhanced communication features. Examples of enhanced communication features include an engine for session persistence, a hardware encryption system, and a hardware packet accelerator.

Another example of an application supported by the advanced communication computer is secure communication. For example, channel aggregation provided by the advanced communication computer can allow the distribution of a dataset, either encrypted or decrypted, over different communication channels. The dataset can be split between multiple communication channels. This increases the bandwidth. This can also prevent hackers or other unauthorized entities from intercepting data packages, correctly assembling intercepted data packages, or both. Additionally or alternatively, an internal secure network can be provided by the advanced communication computer. This network may be set up without any connection to the Internet, but can remain accessible from external locations via other communication networks (e.g., protected satellite communications, LTE 4G communication networks, etc.). In some embodiments, the advanced communication computer can be configured for protection against manipulation from unauthorized entities. For instance, different CPU's can monitor one another. Each CPU can be equipped with a self-healing function to take appropriate action if manipulation on the advanced communication computer's firmware is detected.

Another example of an application supported by the advanced communication computer is monitoring of media content delivery (e.g., Internet Pay-TV, streaming content, satellite TV support, TV and radio, etc.). The advanced communication computer can support these services using functions such as (but not limited to) recording, time-shift viewing, automated billing, digital rights management, and recording. Additionally or alternatively, the advanced communication computer can support distribution of different programs at the same time on local media content delivery networks (e.g., Wi-Fi, Ethernet intelligent cable, satellite TV support if the advanced communication computer includes an additional TV board, etc.). Additionally or alternatively, the advanced communication computer can collect audience-relevant data across multiple platforms (e.g., TV, internet streaming, Wi-Fi).

Another example of an application supported by the advanced communication computer is home entertainment, such as music over the internet, radio, and media database streaming over a local network.

Another example of an application supported by the advanced communication computer is home automation. This can include integration of a complete home automation system. This can also include standard control over the Internet or proprietary control over LTE 4G or other suitable telecommunication networks.

Another example of an application supported by the advanced communication computer is support for surveillance systems (e.g. remote camera access and monitoring, auto alarm function, recording etc.).

Another example of an application supported by the advanced communication computer is support for medical surveillance and alarm systems. For example, the advanced communication computer can be used for medical surveillance of remote accessible medical devices (e.g., heart monitors, fitness trackers, professional medical data collection systems). A main CPU (e.g., the processor 110) can perform real-time data analysis of multiple patients. Stored data history of several months allows accurate analysis of the date and automatic emergency decisions. Additionally or alternatively, the advanced communication computer can provide automatic alarm function. In some embodiments, an automatic alarm function can include forwarding of a patient's location using GPS.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive, and the invention is not limited to these example embodiments but rather encompasses all possible modifications and variations within the scope of the issued claims and their equivalents.

EC 1. An advanced communication computer comprising: (a) a processor; and (b) at least one network adaptor connected to the processor, wherein the at least one network adaptor comprises a separate processor and is configured to communicate with at least one remote network, and wherein the processor is configured to identify an expected performance level of the at least one network adaptor, collect actual performance data from the separate processor, and identify a deviation from the expected performance level based on a comparison between the actual performance data to the expected performance level.

EC 2. The advanced communication computer of any of the preceding or subsequent example combinations, wherein the processor is further configured to identify the deviation based on actual performance data for at least one of a signal condition, network traffic, and interference indicating a performance level that does not satisfy the expected performance level.

EC 3. The advanced communication computer of any of the preceding or subsequent example combinations, wherein the at least one network adaptor is at least one of a Wi-Fi, 1G Ethernet, 10G Ethernet, ADSL/VDSL2+, or 4G LTE network adaptor.

EC 4. The advanced communication computer of any of the preceding or subsequent example combinations, wherein the at least one network adaptor comprises a plurality of network adaptors having respective separate processors and configured to communicate respective remote networks.

EC 5. The advanced communication computer of any of the preceding or subsequent example combinations, wherein the processor is configured to communicate control signals with each of the separate processors, wherein the control signals are configured to cause a reboot or other corrective measures with respect to one of the plurality of network adaptors without interfering with the operation of another of the plurality of network adaptors.

EC 6. The advanced communication computer of any of the preceding or subsequent example combinations, wherein the processor is configured to send encrypted communication through one of the plurality of network adaptors and send an encryption key through another of the plurality of network adaptors.

EC 7. The advanced communication computer of any of the preceding or subsequent example combinations, wherein the processor and a first network adapter from the plurality of network adaptors is a base unit and a second network adapter from the plurality of network adaptors is an add-on unit, wherein the processor in the base unit is configured as a master processor and a separate processor in the add-on unit is configured as a slave processor.

EC 8. A method of operating an advanced communication computer, the advanced communication computer comprising a processor and at least two network adaptors connected to the processor and comprising respective separate processors, at least one remote network connected to each of the at least two network adaptors, the method comprising: (a) identifying, by the processor, an expected performance level of each of the at least two network adaptors; (b) collecting, by the processor, actual performance data from each of the at least two network adaptors; (c) comparing, by the processor, the actual performance data from each of the at least two network adaptors to the expected performance level of each of the at least two network adaptors; (d) identifying, by the processor, a deviation from the expected performance level based on a comparison between the actual performance data to the expected performance level.

EC 9. The method of any of the preceding or subsequent example combinations, wherein the deviation is identified based on actual performance data for at least one of a signal condition, network traffic, and interference indicating a performance level that does not satisfy the expected performance level.

EC 10. The method of any of the preceding or subsequent example combinations, wherein the at least two network adaptors are selected from a Wi-Fi, 1G Ethernet, 10G Ethernet, ADSLA/DSL2+, or 4G LTE network adaptor.

EC 11. The method of any of the preceding or subsequent example combinations, wherein further comprising sending encrypted communication through one of the at least two network adaptors and sending an encryption key through the other one of the at least two network adaptors.

EC 12. The method of any of the preceding or subsequent example combinations, wherein the processor and one of the at least two network adaptors is a base unit and the other one of the at least two network adaptors is an add-on unit comprising a second processor, wherein the method further comprises: configuring the processor in the base unit as a master processor; and configuring the second processor in the add-on unit as a slave processor.

EC 13. A modular gateway system comprising: (a) a base unit comprising: a processor, and at least one base network adaptor connected to the processor, wherein the at least one base network adaptor comprises a separate processor and is configured to be connected to at least one remote network; and (b) an add-on unit connected to the base unit and comprising at least one add-on network adaptor, the at least one add-on network adaptor comprising an additional separate processor and configured to be connected to the at least one add-on network adaptor; wherein the processor in the base unit is configured to identify an expected performance level of the at least one base network adaptor and the at least one add-on network adaptor, collect actual performance data from the at least one base network adaptor and the at least one add-on network adaptor, and identify a deviation from the expected performance level based on a comparison between the actual performance data to the expected performance level.

EC 14. The modular gateway system of any of the preceding or subsequent example combinations, wherein the processor is further configured to identify the deviation based on actual performance data for at least one of a signal condition, network traffic, and interference indicating a performance level that does not satisfy the expected performance level.

EC 15. The modular gateway system of any of the preceding or subsequent example combinations, wherein the at least one base network adaptor and the at least one add-on network adaptor is a Wi-Fi, 1G Ethernet, 10G Ethernet, ADSL/VDSL2+, or 4G LTE network adaptor.

EC 16. The modular gateway system of any of the preceding or subsequent example combinations, wherein the processor is configured to communicate control signals with one of the at least one base network adaptor and the at least one add-on network adaptor, the control signals configured to cause a reboot or other corrective measures without interfering with the operation of another of the at least one base network adaptor and the at least one add-on network adaptor.

EC 17. The modular gateway system of any of the preceding or subsequent example combinations, wherein the processor is configured to send encrypted communication through one of the at least one base network adaptor and the at least one add-on network adaptor and send an encryption key through another of the at least one base network adaptor and the at least one add-on network adaptor.

EC 18. The modular gateway system of any of the preceding or subsequent example combinations, wherein the add-on unit comprises a second processor, wherein the processor in the base unit is configured as a master processor and the processor in the add-on unit is configured as a slave processor.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. An advanced communication computer comprising
a first processor;
a first network adaptor connected to the first processor, wherein the first network adaptor comprises a first network adaptor processor, is a first type of network adaptor, and is configured to communicate with a first remote network, wherein the first remote network comprises a first type of network; and
a second network adaptor connected to the first processor, wherein the second network adaptor comprises a second network adaptor processor, is a second type of network adaptor different from the first type of network adaptor, and is configured to communicate with a second remote network that is different from the first remote network, wherein the second remote network comprises a second type of network different from the first type of network,
wherein the first processor is configured to connect to the first remote network via the first network adaptor and to connect to the second remote network via the second remote network,
wherein the first processor is configured to send an encrypted communication via the first network adaptor and to send an encryption key for the encrypted communication via the second network adaptor,
wherein the first processor is configured to communicate control signals with each of the first network adaptor processor and the second network adaptor processor,
wherein the control signals are configured to cause a reboot or other corrective measures to each of the first network adaptor processor and the second network adaptor processor, and
wherein control of the first network adaptor processor is independent of control of the second network adaptor processor.

2. The advanced communication computer of claim 1, wherein the first processor is further configured to:
identify an expected performance level of the first network adaptor;
collect actual performance data from the first network adaptor processor;
identify a deviation from the expected performance level based on a comparison between the actual performance data to the expected performance level; and
identify the deviation based on actual performance data for at least one of a signal condition, network traffic, or interference indicating a performance level that does not satisfy the expected performance level.

3. The advanced communication computer of claim 1, wherein the first network adaptor comprises at least one of a Wi-Fi network adaptor, 1G Ethernet network adaptor, 10G Ethernet network adaptor, Asymmetric Digital Subscriber Line/Very-high-bit-rate Digital Subscriber Line 2+(ADSL/VDSL2+) network adaptor, or 4G Long-Term Evolution (LTE) network adaptor.

4. The advanced communication computer of claim 1, wherein the first processor and the first network adaptor are a base unit, wherein the second network adaptor is an add-on unit, and wherein the first processor in the base unit is configured as a master processor and the second network adaptor processor in the add-on unit is configured as a slave processor.

5. A modular gateway system comprising:
(a) a base unit comprising:
a processor, and
a base network adaptor connected to the processor, wherein the base network adaptor comprises a base network adaptor processor, is a first type of network adaptor, and is configured to be connected to a first remote network, wherein the first remote network comprises a first type of network; and
(b) an add-on unit connected to the base unit and comprising an add-on network adaptor, the add-on network adaptor comprising an add-on network adaptor processor and configured to be connected to a second remote network that is different from the first remote network, wherein the add-on network adaptor is a second type of network adaptor different from the first type of network adaptor, wherein the second remote network comprises a second type of network different from the first type of network,
wherein the processor in the base unit is configured to distribute a data package by:
splitting the data package into a first data package portion and a second data package portion;
sending the first data package portion via the base network adaptor; and sending the second data package portion via the add-on network adaptor, wherein the processor is configured to communicate control signals with one of the base network adaptor and the add-on network adaptor, wherein the control signals are configured to cause a reboot or other corrective measures to each of the base network adaptor processor and the add-on network adaptor processor, and wherein control of the base network adaptor processor is independent of control of the add-on network adaptor processor.

6. The modular gateway system of claim 5, wherein the processor is further configured to:
identify an expected performance level of the base network adaptor and the add-on network adaptor;
collect actual performance data from the base network adaptor and the add-on network adaptor;
identify a deviation from the expected performance level based on a comparison between the actual performance data to the expected performance level; and
identify the deviation based on actual performance data for at least one of a signal condition, network traffic, and interference indicating a performance level that does not satisfy the expected performance level.

7. The modular gateway system of claim 5, wherein the base network adaptor and the add-on network adaptor each comprise at least one of a Wi-Fi network adaptor, a 1G Ethernet network adaptor, a 10G Ethernet network adaptor, an Asymmetric Digital Subscriber Line/Very-high-bit-rate Digital Subscriber Line 2+(ADSL/VDSL2+) network adaptor, or 4G Long-Term Evolution (LTE) network adaptor.

8. The modular gateway system of claim 5, wherein the first data package portion is an encrypted communication and the second data package portion is an encryption key for the encrypted communication.

9. The modular gateway system of claim 5, wherein the processor in the base unit is configured as a master processor and the add-on network adaptor processor in the add-on unit is configured as a slave processor.

10. A method of controlling remote communication with an advanced communication computer, the method comprising:
splitting, by a first processor of the advanced communication computer, a data package into a first data package portion and a second data package portion;
sending, by the first processor, the first data package portion via a first network adaptor,
wherein the first network adaptor is connected to the first processor and comprises a first network adaptor processor, is a first type of network adaptor, and is configured to communicate with a first remote network comprising a first type of network,
wherein the first processor is configured to connect to the first remote network via the first network adaptor; and
sending, by the first processor, the second data package portion via a second network adaptor,
wherein the second network adaptor is connected to the first processor, wherein the second network adaptor comprises a second network adaptor processor, is a second type of network adaptor different from the first type of network adaptor, and is configured to communicate with a second remote network that is different from the first remote network, wherein the second remote network comprises a second type of network different from the first type of network, and wherein the first processor is configured to connect to the second remote network via the second network adaptor, wherein the first processor is configured to communicate control signals with one of the first network adaptor and the second network adaptor, wherein the control signals are configured to cause a reboot or other corrective measures to each of the first network adaptor processor and the second network adaptor processor, and wherein control of the first network adaptor processor is independent of control of the second network adaptor processor.

11. The method of claim 10, further comprising:
identifying, by the first processor, an expected performance level of the first network adaptor and the second network adaptor;
collecting, by the first processor, actual performance data from each of the first network adaptor and the second network adaptor;
comparing, by the first processor, the actual performance data from each of the first network adaptor and the second network adaptor to the expected performance level of each of the first network adaptor and the second network adaptor; and
identifying, by the first processor, a deviation from the expected performance level based on a comparison between the actual performance data to the expected performance level,
wherein the deviation is identified based on actual performance data for at least one of a signal condition, network traffic, or interference indicating a performance level that does not satisfy the expected performance level.

12. The method of claim 10, wherein the first network adaptor and the second network adaptor are each selected from a Wi-Fi network adaptor, a 1G Ethernet network adaptor, a 10G Ethernet network adaptor, an Asymmetric Digital Subscriber Line/Very-high-bit-rate Digital Subscriber Line 2+(ADSL/VDSL2+) network adaptor, or 4G Long-Term Evolution (LTE) network adaptor.

13. The method of claim 10, wherein the first data package portion comprises an encrypted communication and wherein the second data package portion comprises an encryption key for the encrypted communication.

14. The method of claim 10, wherein the first processor and the first network adaptor are a base unit, wherein the second network adaptor is an add-on unit and, wherein the method further comprises:
configuring the first processor in the base unit as a master processor; and
configuring the second network adaptor processor in the add-on unit as a slave processor.

* * * * *